United States Patent
Qin et al.

(10) Patent No.: US 7,820,580 B2
(45) Date of Patent: Oct. 26, 2010

(54) NICKEL-BASED CATALYSTS FOR PREPARING HIGH CIS 1,4-POLYDIENES

(75) Inventors: Zengquan Qin, Copley, OH (US); Jason T. Poulton, Akron, OH (US); Michael W. Hayes, Canton, OH (US)

(73) Assignee: Bridgestone Corporation (JP)

( * ) Notice: Subject to any disclaimer, the term of this patent is extended or adjusted under 35 U.S.C. 154(b) by 0 days.

(21) Appl. No.: 12/270,424

(22) Filed: Nov. 13, 2008

(65) Prior Publication Data

US 2009/0143551 A1 Jun. 4, 2009

Related U.S. Application Data

(60) Provisional application No. 60/988,167, filed on Nov. 15, 2007.

(51) Int. Cl.
*B01J 31/28* (2006.01)
*B01J 31/18* (2006.01)
*B01J 27/12* (2006.01)
*B01J 27/128* (2006.01)

(52) U.S. Cl. .................. 502/119; 502/128; 502/114; 502/117; 502/230; 526/169.1; 526/172; 526/161; 526/133; 526/157; 526/137; 526/144; 526/153

(58) Field of Classification Search ............... 526/169.1, 526/171, 133, 172, 161, 157, 137, 144, 153; 502/128, 114, 117, 230, 119
See application file for complete search history.

(56) References Cited

U.S. PATENT DOCUMENTS

| | | | |
|---|---|---|---|
| 3,170,907 A | 2/1965 | Ueda et al. | |
| 5,519,101 A | 5/1996 | Nubel et al. | |
| 5,686,543 A | 11/1997 | Yasuda et al. | |
| 6,060,568 A * | 5/2000 | Cavell et al. | 526/131 |
| 6,479,601 B1 | 11/2002 | Kerns et al. | |
| 6,656,867 B2 | 12/2003 | Kerns et al. | |
| 2004/0230015 A1 | 11/2004 | Hinkle et al. | |
| 2005/0090383 A1 * | 4/2005 | Thiele et al. | 502/152 |
| 2008/0114136 A1 | 5/2008 | Suzuki et al. | |

FOREIGN PATENT DOCUMENTS

| | | |
|---|---|---|
| DE | 3916211 | 11/1990 |
| WO | 03048221 | 6/2003 |

OTHER PUBLICATIONS

Cámpora et al., Organometallics, 2006, 25, 3314-3316.*
Campora, Juan et al., "Synthesis and Catalytic Activity of Cationic Allyl Complexes of Nickel Stabilized by a Single N-Heterocyclic Carbene Ligand", Organomettalics, vol. 25, pp. 3314-3316 (2006).
Dible, Benjamin R. et al., "Unusual Reactivity of Molecular Oxygen with π-Allylnickel (N-hetercyclic carbine) Chloride Complexes", J. Am. Chem. Soc., vol. 125, No. 4, pp. 872-873 (2003).
Jang, Youngchan et al., "Effects of Tris(pentafluorophenyl)borane on the Activation of a Metal Alkyl-free Ni-Based Catalyst in the Polymerization of 1,3-Butadiene", Journal of Polymer Science: Part A: Polymer Chemistry, vol. 42, No. 5, pp. 1164-1173 (Mar. 1, 2004).
Kwag, Gwanghoon et al., "Ligand Structure and Cocatalyst Effects on High 1.4-cis Polymerization of 1,3-Butadiene Using Ni-Based Catalysts", Polymer Journal, vol. 31, No. 12, pp. 1274-1276 (1999).
Gao, Wei et al., "Highly cis-1,4 Selective Polymerization of Dienes with Homogeneous Ziegler- Natta Catalysts Based on NCN-Pincer Rare Earth Metal Dichloride Precursors", J. of Am. Chem. Soc., vol. 130, No. 14, pp. 4984-4991 [Mar. 14, 2008].
Park, Hamyong, Jan. 22, 2010 International Search Report from PCT/US2009/046742 [1 pg.].

* cited by examiner

*Primary Examiner*—Rip A. Lee
(74) *Attorney, Agent, or Firm*—Meredith E. Hooker; Nathan Lewis

(57) ABSTRACT

A nickel-carbene polymerization catalyst system for preparing high cis polydienes is provided. The catalyst system comprises (a) a nickel N-heterocyclic carbene complex, (b) an organoaluminum compound, (c) a fluorine-containing compound, and (d) optionally, an alcohol. Also provided is a process for producing a polydiene comprising reacting a conjugated diene in the presence of a polymerization catalyst comprising (a) a nickel N-heterocyclic carbene complex, (b) an organoaluminum compound, (c) a fluorine-containing compound, and (d) optionally, an alcohol.

14 Claims, No Drawings

NICKEL-BASED CATALYSTS FOR PREPARING HIGH CIS 1,4-POLYDIENES

CROSS REFERENCE TO RELATED APPLICATIONS

This application claims the benefit of U.S. Provisional Application No. 60/988,167 filed on Nov. 15, 2007.

FIELD OF THE INVENTION

This invention relates to nickel-based catalysts for preparing high cis 1,4-polydienes with a narrow molecular weight distribution and low vinyl content.

BACKGROUND

Nickel-based catalyst systems including a nickel-containing compound, an organoaluminum compound, and a fluorine-containing compound may be employed for polymerizing conjugated dienes into cis 1,4-polydienes, for example, polymerizing 1,3-butadiene to form cis-1,4-polybutadiene. The cis-1,4-polydienes produced by nickel-based catalyst systems can have a broad molecular weight distribution. Because a polymer having a narrower molecular weight distribution may offer certain advantages such as higher abrasion resistance, lower hysteresis, and better tensile properties, it is desirable to develop a nickel-based catalyst system that is capable of producing cis-1,4-polydienes having a narrower molecular weight distribution.

BRIEF SUMMARY OF THE INVENTION

The present invention provides a nickel-carbene polymerization catalyst system for preparing high cis polydienes comprising:
(a) a nickel N-heterocyclic carbene complex;
(b) an organoaluminum compound;
(c) a fluorine-containing compound; and
(d) optionally, an alcohol.

Also provided is a process for producing a polydiene comprising reacting a conjugated diene in the presence of a polymerization catalyst comprising:
(a) a nickel N-heterocyclic carbene complex;
(b) an organoaluminum compound;
(c) a fluorine-containing compound; and
(d) optionally, an alcohol.

In a preferred embodiment, the conjugated diene is 1,3-butadiene.

DETAILED DESCRIPTION OF THE INVENTION

The present disclosure is directed towards a polymerization catalyst that comprises (a) a nickel N-heterocyclic carbene complex, (b) an organoaluminum compound, (c) a fluorine-containing compound, and (d) optionally, an alcohol.

A nickel N-heterocyclic carbene complex is used as a component of the catalyst system. Suitable nickel N-heterocyclic carbene complexes include those having a structure according to either Formula I or II:

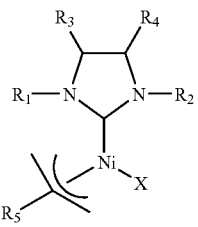

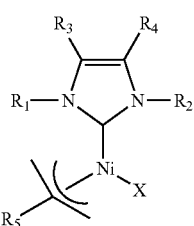

wherein $R_1$ and $R_2$ are selected from the group consisting of $C_1$-$C_{12}$ alkyl, $C_2$-$C_{12}$ alkene, $C_2$-$C_{12}$ alkyne, phenyl, alkyl-substituted phenyl, and mixtures thereof and may all be identical or may all be separately selected but cannot be H; $R_3$, $R_4$ and $R_5$ are selected from the group consisting of H, $C_1$-$C_{12}$ alkyl, $C_2$-$C_{12}$ alkene, $C_2$-$C_{12}$ alkyne, phenyl, alkyl-substituted phenyl, and mixtures thereof and may all be identical or may all be separately selected; and X is a halogen.

In one particular embodiment, the nickel N-heterocyclic carbene complex may have a structure according to either Formula III or IV:

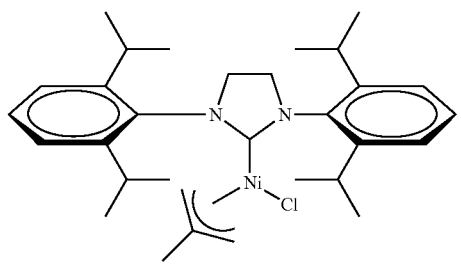

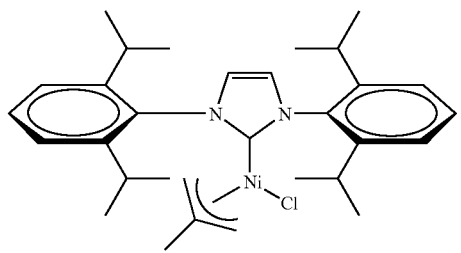

A suitable method of producing the allylnickel N-heterocyclic carbene complexes having the structures of Formulas III and IV is illustrated in Scheme 1. The method starts with nickel cyclooctadiene (COD) which, in one embodiment, may be prepared according to the procedure described by Dible, B. R. and Sigman, M. S. (*J. Am. Chem. Soc.*, 2003, 125, pp. 872-873), hereby incorporated by reference in its entirety. The dimer of allylnickel chloride 2 is formed by reaction with allylchloride in the presence of COD. Dimer 2 is then reacted with the N-heterocyclic carbene ligand L giving the complexes of formula III and IV in near quantitative yield.

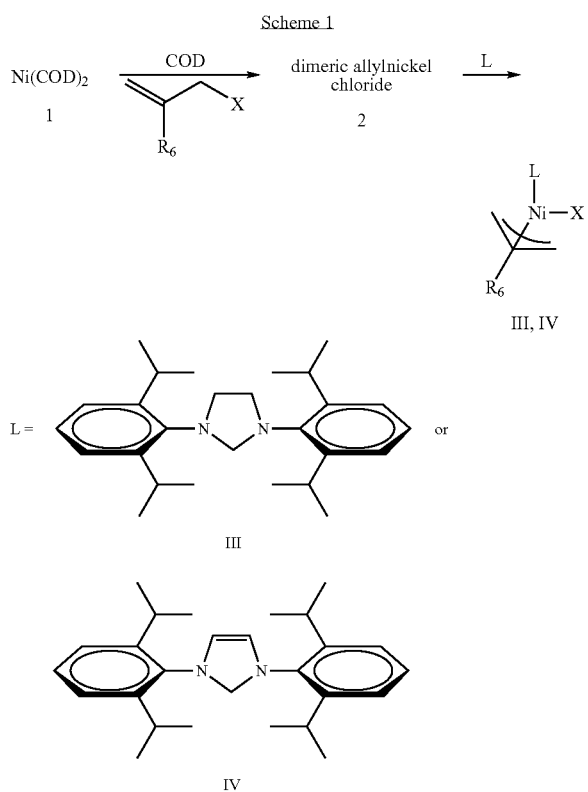

wherein COD=cyclooctadiene, $R_6$ is selected from the group consisting of H, $C_1$-$C_{12}$ alkyl, $C_2$-$C_{12}$ alkene, $C_2$-$C_{12}$ alkyne, phenyl, alkyl-substituted phenyl, and X is a halogen. In the case of the allylnickel (N-heterocyclic carbine) chloride complexes shown in Formulas III and IV, above, X is chlorine.

In the catalyst systems of the present invention, the nickel-carbene complexes prepared may be used in conjunction with an organoaluminum compound and a fluorine-containing compound as described hereinbelow.

The term "organoaluminum compound" refers to any aluminum compound containing at least one aluminum-carbon bond. Organoaluminum compounds that are soluble in a hydrocarbon solvent are preferred. A preferred class of organoaluminum compounds that can be utilized is represented by the general formula $AlR_n X_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Suitable organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. Trihydrocarbylaluminum, dihydrocarbylaluminum hydride, and hydrocarbylaluminum dihydride compounds are preferred.

Suitable trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum chloride compounds include diethylaluminum chloride, dipropylaluminum, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dichlorides include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of suitable organoaluminum compounds is aluminoxanes. Aluminoxanes comprise oligomeric linear aluminoxanes that can be represented by the general formula:

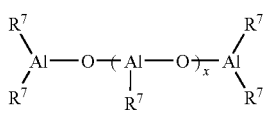

and oligomeric cyclic aluminoxanes that can be represented by the general formula:

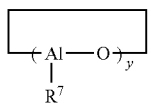

where x is an integer of 1 to about 100, preferably about 10 to about 50; y is an integer of 2 to about 100, preferably about 3 to about 20; and where each $R^7$, which may be the same or different, is a mono-valent organic group that is attached to the aluminum atom via a carbon atom. Preferably, each $R^7$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one preferred embodiment, methyl aluminoxane and diisobutyl aluminum hydride are employed in combination.

Another component of the catalyst system that may be employed in the catalyst composition is a fluorine-containing compound. Suitable fluorine-containing compounds include, but are not limited to, hydrogen fluoride, boron trifluoride, silicon tetrafluoride, aluminum triflouride, indium triflouride, zinc difluoride, dimethylaluminum fluoride, diethyl aluminum fluoride, methylaluminum difluoride. Preferable fluorine-containing compounds include hydrogen fluoride, boron trifluoride, and hydrogen fluoride and boron trifluoride being complexed with a member of the class consisting of monohydric alcohols, phenols, water, mineral acids containing oxygen, water, aldehydes, esters, ethers, ketones and nitriles.

The ketone subclass can be defined by the formula R'COR where R' and R represent a alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. Representative but not exhaustive of the ketones useful in the preparation of the boron trifluoride and hydrogen fluoride complexes of this invention are acetone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. Typical complexes of the ketones are boron trifluoride.acetophenone and boron trifluoride.benzophenone, also hydrogen fluoride.acetophenone and hydrogen fluoride.benzophenone and hydrogen fluoride.

The aldehyde subclass can be defined by the formula R'CHO where R represents an alkyl, cycloalkyl, aryl, alkaryl and arylalkyl radical containing from 1 to about 30 carbon atoms. The aldehydes have a carbon atom attached to an oxygen atom by means of a double bond. Representative but not exhaustive of the aldehydes are butyraldehyde, anisaldehyde, cinnamic aldehyde, isobutyraldehyde, heptaldehyde, dodecylaldehyde, benzaldehyde, phenylacetaldehyde, tolualdehyde, m-nitrobenzaldehyde, p-nitrobenzaldehyde, m-hydrobenzaldehyde and the like. Typical complexes that may be formed from the aldehydes are boron trifluoride-benzaldehyde, boron trifluoride-tolualdehyde, hydrogen fluoride-benzaldehyde and hydrogen fluoride-tolualdehyde, for example.

The ester subclass can be represented by the formula R'—COOR where R' and R are represented by alkyl, cycloalkyl, aryl, alkaryl, and arylalkyl radicals containing from 1 to about 30 carbon atoms. The esters contain a carbon atom attached by a double bond to an oxygen atom. Representative but not exhaustive of the esters are ethyl butyrate, ethyl octanoate, isopropyl hexanoate, amyl acetate, hexyl propionate, cetyl acetate, ethyl benzoate, amyl benzoate, phenyl acetate, phenyl butyrate, phenyl benzoate and the like. Typical complexes formed from the esters are boron trifluoride-ethyl benzoate and boron trifluoride-phenyl acetate; also hydrogen fluoride-ethyl benzoate, and hydrogen fluoride-phenyl acetate, for example.

The ether subclass can be defined by the formula R—O—R where each R independently represents an alkyl, cycloalkyl, aryl, alkaryl and arylalkyl radical containing from 1 to about 30 carbon atoms. Representative but not exhaustive of the ethers are ethoxybutane, ethoxyoctane, isopropoxyhexane, propoxyhexane, ethoxybenzene, amyloxybenzene and the like.

The nitrile subclass can be represented by the formula RCN wherein R represents an alkyl, cycloalkyl aryl, alkaryl, and arylalkyl. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. Typical complexes prepared from the nitrites are boron trifluoride.benzonitrile, and hydrogen fluoride.benzonitrile, for example.

The monohydric alcohol subgroup of the above class of compounds can be symbolically portrayed as ROH where R represents an alkyl, cycloalkyl, and an arylalkyl radical containing from 1 to 30 carbon atoms. Representative, but not exhaustive of the alcohol group, are methanol, ethanol, n-propanol, isopropanol, n-butanol, benzyl alcohol, and the like. Typical complexes formed from the above groups are as follows: $BF_3$ methanol, $BF_3$ ethanol, $BF_3$ butanol, $BF_3$ n-hexanol, HF methanol, HF butanol and HF hexanol, for example.

The phenol subgroup of the above class of compounds can be symbolically portrayed as PHI-OH wherein PHI represents a benzenoid group. Representative but not exhaustive of the phenol group are phenol, p-cresol, resorcinol, naphthol, hydroquinone and the like. Typical complexes formed from the above phenol subgroup are as follows: $BF_3$ 2-phenol, $BF_3$ p-cresol, HF p-cresol and HF phenol, for example.

A number of the members in the subgroup mineral acids containing oxygen will complex with $BF_3$ and HF. Representative but not exhaustive of the mineral acid subgroup are phosphoric acid, sulfuric acid, nitric acid and the like. Examples of complexes formed from the mineral acid subgroup are $BF_3$ 100% phosphoric acid, $BF_3$ 85% phosphoric acid and HF 100% phosphoric acid, for example.

Water, although in a subgroup by itself, forms at least two hydrate complexes. These are $BF_3.H_2O$ and $BF_3.2H_2O$.

When not available commercially, many of the boron trifluoride complexes can be readily formed by directly contacting boron trifluoride gas, (a colorless gas at ordinary temperatures and pressures) with the compound used as the complexing agent, that is, the electron donor compound. This contact is accomplished with a reacting apparatus combined with a sensitive weighing mechanism in order to achieve the desired mole ratios between the $BF_3$ and the electron donor compound. The reaction is carried out under an inert atmosphere. The reaction environment may consist only of the reacting components, $BF_3$ gas, and the electron donor compound, or when convenient, the reaction may be carried out in the medium of an inert organic diluent. This last condition is usually necessary when the electron donor compound exists as a solid and must be put into solution or suspension to insure adequate contact with the $BF_3$ gas.

The various boron trifluoride complexes vary greatly in their shelf life stability. Some, for example, $BF_3$.isopropanol, are quite unstable in daylight at room temperature. Others, for example, $BF_3$.phenol are quite stable and possess a relatively long shelf life at room temperature. Where the particular $BF_3$ complex possesses an unstable shelf life, it is desirable for it to be prepared as near to the time of polymerization as feasible.

Hydrogen fluoride complexes usually have a lower vapor pressure and do not fume as much as hydrogen fluoride. Hydrogen fluoride boils at 19.7° C., whereas a 40% by weight of hydrogen fluoride diethyl ether azeotrope boils at 74° C. When the hydrogen fluoride is complexed, the corrosiveness of the hydrogen fluoride is reduced. The hydrogen fluoride complex can be dissolved in a solvent and thus can be handled and charged to the system as a liquid solution. The solvent which can be employed may be an alkyl, alkaryl, arylalkyl or an aryl hydrocarbon. Benzene, for example, is a convenient solvent system.

The $BF_3$ and HF complexes may be prepared by simply dissolving appropriate amounts of the complexing agent, for instance, a ketone, an ether, an ester, an alcohol, a nitrile or water, in a suitable solvent and an appropriate amount of the hydrogen fluoride in a suitable solvent and mixing the two solvent systems. The mixing of the complexing agents, except water, may be done in the absence of water vapor. Another possible method would be to dissolve either the hydrogen fluoride or the complexing agent in a suitable solvent and adding the other component. Still another method of mixing would be to dissolve the complexing agent in a solvent and simply bubble gaseous hydrogen fluoride through the system until the complexing agent is reacted with hydrogen fluoride. The concentrations may be determined by weight gain or chemical titration. The amount of complexing agent may be a range depending on the conditions of the reaction system, the hydrogen bonding strength of the complexing agent, the size of the complexing agent, or it may be an equilibrium between the hydrogen fluoride complex and the hydrogen fluoride plus the complexing agent.

The catalyst system may optionally include an alcohol component. In one embodiment, the alcohol component is selected from the group consisting of $C_2$ to $C_{30}$ alcohols, or more preferably n-hexanol or n-octanol, and even more preferably 4-tert-butylcyclohexanol. In one embodiment it may be useful to coordinate an alcohol component to a fluoride compound.

The optimum concentration of any one catalyst component is dependent upon the concentration of each of the other catalyst components. Furthermore, the concentration of the catalyst employed depends on factors such as purity, rate desired, temperature and other factors. While polymerization will occur over a wide range of catalyst concentrations and mole ratios, polymers having the most desirable properties are obtained over a more narrow range.

In one embodiment, the nickel N-heterocyclic carbene complex of the formula I or II may be present in a catalytic amount of from about 0.01 mmol Ni/100 g monomer to about 0.2 mmol Ni/100 g monomer, and preferably is present in a catalytic amount of about 0.02 mmol Ni/100 g monomer to about 0.1 mmol Ni/100 g monomer. The organoaluminum compound may be present in a catalytic amount of from about 0.15 mmol Al/100 g monomer to about 2.0 mmol Al/100 g monomer, and preferably is present in a catalytic amount of about 0.30 mmol Al/100 g monomer to about 1.0 mmol Al/100 g monomer. The fluorine-containing compound may be present in a catalytic amount of from about 0.15 mmol F/100 g monomer to about 6.0 mmol F/100 g monomer, and preferably is present in a catalytic amount of about 0.6 mmol F/100 g monomer to about 3.0 mmol F/100 g monomer. If present, the alcohol may be present in a catalytic amount of from about 0.15 mmol/100 g monomer to about 6.0 mmol/

100 g monomer, and preferably is present in a catalytic amount of about 0.3 mmol/100 g monomer to about 3.0 mmol/100 g monomer.

The catalyst composition is formed by combining or mixing a nickel N-heterocyclic carbene complex, an organoaluminum compound, a fluorine-containing compound, and optionally, an alcohol.

Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this invention can be formed by using one of the following methods.

First, the catalyst composition may be formed in situ by adding the catalyst ingredients to a solution containing monomer and solvent, or simply bulk monomer, in either a stepwise or simultaneous manner. When adding the catalyst ingredients in a stepwise manner, the sequence in which the catalyst ingredients are added is not critical. Preferably, however, the organoaluminum compound is added first, followed by the nickel N-heterocyclic carbene complex, followed by the alcohol compound, if used, and then followed by the fluorine-containing compound.

Second, the catalyst ingredients may be pre-mixed outside the polymerization system at an appropriate temperature, which is generally from about −20° C. to about 80° C., and the resulting catalyst composition is then added to the monomer solution.

Third, the catalyst composition may be pre-formed in the presence of at least one conjugated diene monomer. That is, the catalyst ingredients are pre-mixed in the presence of a small amount of conjugated diene monomer at an appropriate temperature, which is generally from about −20° C. to about 80° C. The amount of conjugated diene monomer that is used for pre-forming the catalyst can range from about 1 to about 500 moles per mole, more preferably from about 5 to about 250 moles per mole, and even more preferably from about 10 to about 100 moles per mole of the nickel N-heterocyclic carbene complex. The resulting catalyst composition is then added to the remainder of the conjugated diene monomer that is to be polymerized.

Fourth, the catalyst composition may be formed by using a two-stage procedure. The first stage involves combining the organoaluminum compound with the nickel N-heterocyclic carbene complex in the absence of conjugated diene monomer or in the presence of a small amount of conjugated diene monomer at an appropriate temperature, which is generally from about −20° C. to about 80° C. In the second stage, the foregoing reaction mixture and the remaining catalyst components are charged in either a stepwise or simultaneous manner to the remainder of the conjugated diene monomer that is to be polymerized.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. The organic solvent is preferably inert to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred.

The polymerization is preferably carried out in an organic solvent as the diluent. In one embodiment, a solution polymerization system is employed, which is a system where the monomer to be polymerized and the polymer formed are soluble in the polymerization medium. Alternatively, a precipitation polymerization system may be employed by choosing a solvent in which the polymer formed is insoluble. In both cases, the monomer to be polymerized is in a condensed phase. Also, the catalyst ingredients are preferably solubilized or suspended within the organic solvent. In other words, the catalyst ingredients are preferably not impregnated onto a catalyst support.

In performing these polymerizations, an amount of organic solvent in addition to the amount of organic solvent that may be used in preparing the catalyst composition is preferably added to the polymerization system. The additional organic solvent may be the same as or different from the organic solvent used in preparing the catalyst composition. An organic solvent that is inert with respect to the catalyst composition employed to catalyze the polymerization is preferably selected. Exemplary hydrocarbon solvents have been set forth above. When a solvent is employed, the concentration of the monomer to be polymerized is not limited to a special range. Preferably, however, the concentration of the monomer present in the polymerization medium at the beginning of the polymerization should be in a range of from about 3% to about 80% by weight, more preferably from about 5% to about 50% by weight, and even more preferably from about 10% to about 30% by weight.

The polymerization may also be carried out by means of bulk polymerization, which refers to a polymerization environment where no solvents are employed. The bulk polymerization can be conducted either in a condensed liquid phase or in a gas phase.

The polymerization may be carried out as a batch process, a continuous process, or a semi-continuous process. In the semi-continuous process, monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as about −10° C. or below, to a high temperature such as about 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization stopping agent that inactivates the catalyst. Typically, this period of time is from about 20 minutes to about 24 hours and will depend on other polymerization conditions such as temperature as well as the choice of catalyst. Typically, the stopping agent employed is a protic compound, which includes, but is not limited to, an alcohol, a carboxylic acid, an inorganic acid, water, or a mixture thereof.

In one embodiment a stopping agent mixture for use in the present invention includes an inorganic base in an amine-water mixture. When $BF_3$ is used as the fluorine-containing compound and a mixture of water and an amine are used to stop the polymerization, the water reacts with the organoaluminum compound and/or $BF_3$ to deactivate the catalyst components, leaving the amine available to react with the trialkylboranes. The use of an amine-water mixture is detailed in commonly assigned U.S. Pat. No. 6,596,825, entitled "Low Gel High C is Polydiene," the disclosure of which is incorporated herein by reference in its entirety. The inorganic base can be used to neutralize the acidic by-products of the stopping and polymerization reactions. This allows for the addition of less amine and reduces or eliminates corrosion in the reaction vessel by raising the pH of the system.

The inorganic base/amine/water mixture may be added in conjunction or in series. In one embodiment the mixture may be added in series. The molar ratio of amine:water may be about 1:100, and in a more specific embodiment about 1:500. The water component of the stopping agent mixture may additionally include an alcohol. In one embodiment the alcohols are one or more of methanol, ethanol, isopropanol, propanol, and butanol. When included, a water:alcohol ratio may be about 1:500, and in a more specific embodiment, about 1:50. Alternately, the water can be omitted from the stopping agent mixture such that the stopping agent mixture includes only an amine/inorganic base mixture.

Suitable amines include ammonia, ammonium hydroxide, primary amine, secondary amine, tertiary amine, aliphatic amine and aromatic amine. Exemplary amines include, but are not limited to, pyridine, aniline, benzylamine, n-butylamine, cyclohexylamine, diethylamine, diisopropylamine, dimethylamine, diphenylamine, ethylamine, ethylenediamine, hexamethylene diamine, N,N-diethylcyclohexylamine, N,N-dimethylcyclohexylamine, N,N,N'-trimethyl ethylene diamine, N,N,N'N'-tetramethyl ethylene diamine (TMEDA); and substituted pyridines such as N,N-dimethylaminopyridine (DMAP), 4-pyrrolidinopyridine, and 4-piperidinopyridine. TMEDA may be used as the amine component of the stopping agent mixture, with or without the use of water.

Another stopping agent mixture includes a carboxylic acid and an inorganic base. The inorganic base includes those described above. Suitable carboxylic acids include those represented by the formula:

R—COOH wherein R is selected from the group consisting of alkyl, cycloalkyl and arylalkyl substituted or unsubstituted containing from 3 to 20 carbon atoms. A carboxylic acid that can be used for use in the stopping agent mixture is 2-ethyl hexanoic acid (EHA) A metal salt of a carboxylic acid may also be added to the stopping agent mixture. Thus, another stopping agent mixture includes a mixture of EHA and the calcium salt of EHA. As with the amine based stopping agent mixture described above, water may or may not be included in the carboxylic acid based stopping agent mixture. Again, the inorganic base is thought to react with acid byproducts believed to be produced during polymerization as well as any acidic products that may result from residual water reacting with the EHA or other carboxylic acid used.

When used with both the amine and the carboxylic acid, the amount of inorganic base added to the reaction mixture is preferably enough to maintain the pH in the reaction vessel above 7. In one embodiment, an amount of inorganic base is added to adjust the pH to about 7-9. Although not intended to be limiting, a suitable amount for use in the present invention is an amount equal to the molar equivalent of the $F^-$ ions present in the reaction mixture from the fluorine-containing compound. The use of the inorganic base in the stopping agent mixture reduces the amount of amine necessary to effectively stop the polymerization.

An antioxidant such as 2,6-di-tert-butyl-4-methylphenol may be added along with, before, or after the addition of the stopping agent. The amount of the antioxidant employed is usually in the range of 0.2% to 1% by weight of the polymer product.

When the polymerization has been stopped, polymer product can be recovered from the polymerization mixture by utilizing conventional procedures of desolventization and drying. For instance, the polymer may be isolated from the polymerization mixture by coagulating the polymerization mixture with an alcohol such as methanol, ethanol, or isopropanol, followed by filtration, or by steam distilling the solvent and the unreacted monomer, followed by filtration. The isolated polymer product is then dried to remove residual amounts of solvent and water. Alternatively, the polymer may be isolated from the polymerization mixture by directly drum drying the polymer cement.

The catalyst composition of this invention exhibits high catalytic activity for polymerizing conjugated dienes into high cis-1,4-polydienes. Although one preferred embodiment is directed toward the polymerization of 1,3-butadiene into cis-1,4-polybutadiene, other conjugated dienes can also be polymerized. Some specific examples of other conjugated dienes that can be polymerized include isoprene, 1,3-pentadiene, 1,3-hexadiene, 2,3-dimethyl-1,3-butadiene, 2-ethyl-1, 3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

The high cis-1,4-polydienes polymerized using the catalyst composition disclosed herein will typically have cis-1,4 content of at least about 90%, and preferably at least 95%. The high cis-1,4-polydienes also typically have a number average molecular weight range of from about 75,000 to about 200,000, a molecular weight distribution of from about 2 to about 4, and a vinyl content of less than about 2%.

The high cis-1,4-polydienes produced with the catalyst composition disclosed herein has many uses. It can be blended into and concurred with various natural or synthetic rubbers in order to improve the properties thereof. For example, it can be incorporated into elastomers in order to improve tensile properties, abrasion and fatigue resistance, and to reduce hysteresis loss. Accordingly, the cis-1,4-polydienes, especially high cis-1,4-polybutadiene, is useful in rubber compositions that are useful for tire treads and tire sidewalls.

In order to demonstrate the practice of the present invention, the following examples have been prepared and tested. The examples should not, however, be viewed as limiting the scope of the invention. The claims will serve to define the invention.

EXAMPLES

The N-heterocyclic carbene ligands, 1,3-bis(2,6-diisopropylphenyl)imidazol-2-ylidene (IiPr) and 1,3-bis(2,6-diisopropylphenyl)-4,5-dihydroimidazol-2-ylidene (SIiPr), were prepared following the literature [B. R. Dible, M. S. Sigman, *J. Am. Chem. Soc.*, 2003, 125, 872], hereby incorporated by reference in its entirety. The nickel N-heterocyclic carbene (NHC) complexes (methylallyl)Ni(SIiPr)Cl (1) and (methylallyl)Ni(IiPr)Cl (2) were also synthesized following the same literature procedure except that 2-methylallylnickel chloride was used instead of allylnickel chloride.

In the Examples, parts and % are by weight unless otherwise specified.

In the Examples, the following methods were employed in determining polymer properties. The molecular weight was determined by GPC (gel permeation chromatography) using a polybutadiene standard and THF as a solvent. The glass transition temperature (Tg) was determined using DSC (differential scanning calorimetry) at a rate of 1° C. per minute. Finally, the cis-1,4, trans-1,4, and vinyl contents were determined by subjecting a polymer sample dissolved in $CS_2$ to FTIR.

Example 1

To dry bottles purged with nitrogen was added hexane and 1,3-butadiene (Bd) blend in hexane, resulting in a 300 g of 15.0% Bd solution in hexane. To the solution was charged sequentially with triethylaluminum (TEA) solution [0.27 mmol Al/100 g monomer], (methylallyl)Ni(SIiPr)Cl (1) [0.030 mmol Ni/100 g monomer], and finally boron trifluoride dibutyl etherate ($BF_3.OBu_2$) solution [0.675 mmol $BF_3$/100 g monomer]. The bottles were placed in a 65° C. water-bath for six hours. Then the reaction mixtures were treated with isopropanol containing 2,6-di-tert-butyl-4-methylphenol (BHT) in order to deactivate the catalyst, coagulate and stabilize the polymers. The polybutadiene was then dried in a drum-dryer at 120° C. Yield: 48%. Mn=95,228, MWD=4.15. cis-1.4%=97.08%, trans-1.4=1.19%, vinyl %=1.73%.

Example 2

To dry bottles purged with nitrogen was added hexane and 1,3-butadiene (Bd) blend in hexane, resulting in a 300 g of 15.0% Bd solution in hexane. To the solution was charged sequentially with triethylaluminum (TEA) solution [0.45 mmol Al/100 g monomer], (methylallyl)Ni(IiPr)Cl (2) [0.050 mmol Ni/100 g monomer], and finally boron trifluoride dibutyl etherate ($BF_3.OBu_2$) solution [1.125 mmol $BF_3$/100 g monomer]. The bottles were placed in a 65° C. water-bath for four hours. Then the reaction mixtures were treated with isopropanol containing 2,6-di-tert-butyl-4-methylphenol (BHT) in order to deactivate the catalyst, coagulate and stabilize the polymers. The polybutadiene was then dried in a drum-dryer at 120° C. Yield: 63%. Mn=110,727, MWD=3.22. cis-1.4%=97.20%, trans-1.4=1.05%, vinyl %=1.75%.

Example 3

To dry bottles purged with nitrogen was added hexane and 1,3-butadiene (Bd) blend in hexane, resulting in a 300 g of 15.0% Bd solution in hexane. To the solution was charged sequentially with triisobutylaluminum (TIBA) solution [0.45 mmol Al/100 g monomer], (methylallyl)Ni(IiPr)Cl (2) [0.050 mmol Ni/100 g monomer], and finally boron trifluoride dibutyl etherate ($BF_3.OBu_2$) solution [1.125 mmol $BF_3$/100 g monomer]. The bottles were placed in a 65° C. water-bath for four hours. Then the reaction mixtures were treated with isopropanol containing 2,6-di-tert-butyl-4-methylphenol (BHT) in order to deactivate the catalyst, coagulate and stabilize the polymers. The polybutadiene was then dried in a drum-dryer at 120° C. Yield: 64%. Mn=147,355, MWD=2.39. cis-1.4%=98.02%, trans-1.4=0.90%, vinyl %=1.08%. Tg=−106.25° C., Tm=−6.65° C.

Example 4

To dry bottles purged with nitrogen was added hexane and 1,3-butadiene (Bd) blend in hexane, resulting in a 300 g of 15.0% Bd solution in hexane. To the solution was charged sequentially with triisobutylaluminum (TIBA) solution [0.45 mmol Al/100 g monomer], (methylallyl)Ni(IiPr)Cl (2) [0.050 mmol Ni/100 g monomer], and finally boron trifluoride dibutyl etherate ($BF_3.OBu_2$) solution [1.125 mmol $BF_3$/100 g monomer]. The bottles were placed in a 50° C. water-bath for twenty-four hours. Then, the reaction mixtures were treated with isopropanol containing 2,6-di-tert-butyl-4-methylphenol (BHT) in order to deactivate the catalyst, coagulate and stabilize the polymers. The polybutadiene was then dried in a drum-dryer at 120° C. Yield: 93%. Mn=184,180, MWD=2.18. cis-1.4%=98.18%, trans-1.4=0.81%, vinyl %=1.01%. Tg=−106.74° C., Tm=−6.28° C.

Example 5

To dry bottles purged with nitrogen was added hexane and 1,3-butadiene (Bd) blend in hexane, resulting in a 300 g of 15.0% Bd solution in hexane. To the solution was charged sequentially with triethylaluminum (TEA) solution [0.45 mmol Al/100 g monomer], (methylallyl)Ni(IiPr)Cl (2) [0.050 mmol Ni/10 g monomer], and finally boron trifluoride dibutyl etherate ($BF_3.OBu_2$) solution [1.125 mmol $BF_3$/10 g monomer]. The bottles were placed in a 50° C. water-bath for twenty-four hours. Then, the reaction mixtures were treated with isopropanol containing 2,6-di-tert-butyl-4-methylphenol (BHT) in order to deactivate the catalyst, coagulate and stabilize the polymers. The polybutadiene was then dried in a drum-dryer at 120° C. Yield: 74%. Mn=121,087, MWD=3.42. cis-1.4%=97.37%, trans-1.4=1.01%, vinyl %=1.62%. Tg=−106.49° C., Tm=−7.27° C.

Example 6

To dry bottles purged with nitrogen was added hexane and 1,3-butadiene (Bd) blend in hexane, resulting in a 300 g of 15.0% Bd solution in hexane. To the solution was charged sequentially with triisobutylaluminum (TIBA) solution [0.45 mmol Al/100 g monomer], (methylallyl)Ni(IiPr)Cl (2) [0.050 mmol Ni/100 g monomer], 4-tert-butylcyclohexanol solution [0.90 mmol ROH/100 g monomer], and finally boron trifluoride dibutyl etherate ($BF_3.OBu_2$) solution [1.125 mmol $BF_3$/100 g monomer]. The bottles were placed in a 50° C. water-bath for eighteen hours. Then the reaction mixtures were treated with isopropanol containing 2,6-di-tert-butyl-4-methylphenol (BHT) in order to deactivate the catalyst, coagulate and stabilize the polymers. The polybutadiene was then dried in a drum-dryer at 120° C. Yield: 93%. Mn=131,288, MWD=2.97. cis-1.4%=97.44%, trans-1.4=1.00%, vinyl %=1.55%. Tg=−103.72° C., Tm=−7.60° C.

To the extent that the teachings of the present invention may apply to the teachings of the prior art references incorporated herein by reference, as will be appreciated by those of skill in the art, the present disclosure contemplates such application of the principles of the present invention in combination with those prior art teachings.

What is claimed is:

1. A polymerization catalyst system comprising:
   (a) a nickel N-heterocyclic carbene complex;
   (b) an organoaluminum compound;
   (c) a fluorine-containing compound; and
   (d) optionally, an alcohol,
   where said fluorine-containing compound is selected from one or more of the following:
   (i) hydrogen fluoride,
   (ii) boron trifluoride,
   (iii) silicon tetrafluoride,
   (iv) aluminum trifluoride,
   (v) indium trifluoride,
   (vi) zinc difluoride,
   (vii) dimethylaluminum fluoride,
   (viii) diethyl aluminum fluoride,
   (ix) methylaluminum difluoride,
   (x) complexes of hydrogen fluoride with monohydric alcohols, phenols, water, mineral acids containing oxygen, water, aldehydes, esters, ethers, ketones or nitriles, or
   (xi) complexes of boron trifluoride with monohydric alcohols, phenols, water, mineral acids containing oxygen, water, aldehydes, esters, ethers, ketones or nitriles.

2. The polymerization catalyst according to claim 1, wherein said nickel N-heterocyclic carbene complex is a compound of the formula I or II:

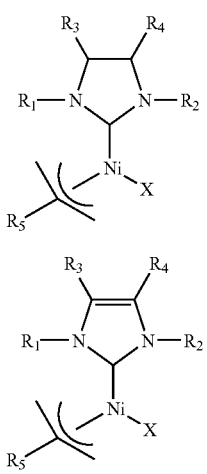

wherein $R_1$ and $R_2$ are selected from the group consisting of $C_1$-$C_{12}$ alkyl, $C_2$-$C_{12}$ alkenyl, $C_2$-$C_{12}$ alkynyl, phenyl, alkyl-substituted phenyl, and combinations thereof and may all be identical or may all be separately selected but cannot be H, $R_3$, $R_4$ and $R_5$ are selected from the group consisting of H, $C_1$-$C_{12}$ alkyl, $C_2$-$C_{12}$, $C_2$-$C_{12}$ alkynyl, phenyl, alkyl-substituted phenyl, and combinations thereof and may all be identical or may all be separately selected, and
X is a halogen.

3. The polymerization catalyst according to claim 2, wherein said nickel N-heterocyclic carbene complex is a compound of the formula III or IV:

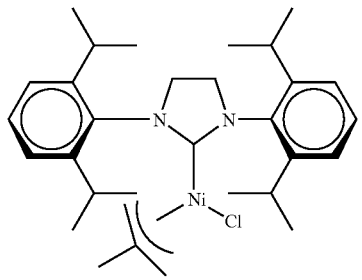

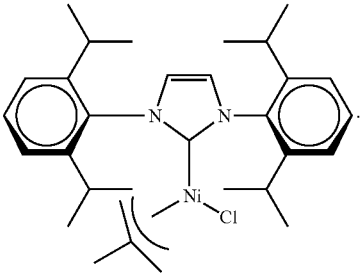

4. The polymerization catalyst according to claim 1, wherein said fluorine-containing compound is a complex of boron trifluoride and a compound selected from the group consisting of $C_1$-$C_5$ aliphatic ethers, alcohols, ketones and nitriles.

5. The polymerization catalyst according to claim 1, wherein said optional alcohol is a $C_1$-$C_{30}$ monohydric aliphatic alcohol.

6. A polymerization catalyst according to claim 1 wherein said organoaluminum compound is selected from the group consisting of trimethylaluminum, triethylaluminum, tripropylaluminum, tributylaluminum, triisobutylaluminum, trihexylaluminum, trioctylaluminum and diisobutylaluminum hydride.

7. The polymerization catalyst according to claim 6 wherein said organoaluminum compound is triethylaluminum or triisobutylaluminum.

8. The polymerization catalyst according to claim 4 wherein said boron trifluoride complex is boron trifluoride dibutyl etherate.

9. A polymerization catalyst comprising:
   (a) a nickel N-heterocyclic carbene complex;
   (b) an organoaluminum compound;
   (c) a fluorine-containing compound; and
   (d) optionally, an alcohol,
   wherein said nickel N-heterocyclic carbene complex is a compound of the formula I or II:

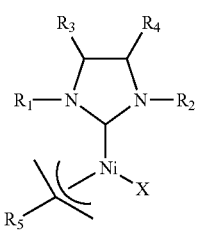

-continued

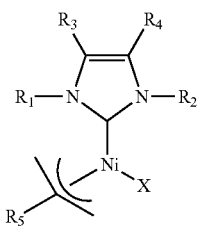

II wherein $R_1$ and $R_2$ are selected from the group consisting of $C_1$-$C_{12}$ alkyl, $C_2$-$C_{12}$ alkenyl, $C_2$-$C_{12}$ alkynyl, phenyl, alkyl-substituted phenyl, and combinations thereof and may all be identical or may all be separately selected but cannot be H, $R_3$, $R_4$ and $R_5$ are selected from the group consisting of H, $C_1$-$C_{12}$ alkyl, $C_2$-$C_{12}$ alkenyl, $C_2$-$C_{12}$ alkynyl, phenyl, alkyl-substituted phenyl, and combinations thereof and may all be identical or may all be separately selected, and
X is a halogen.

10. The polymerization catalyst according to claim 9, wherein said nickel N-heterocyclic carbene complex is a compound of the formula III or IV:

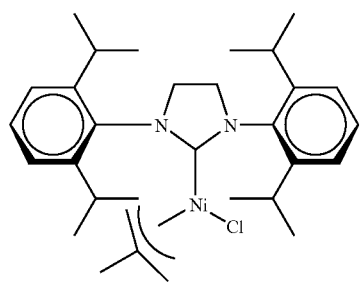

III

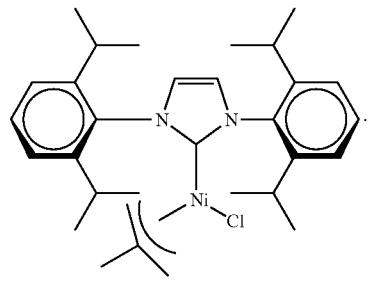

IV

11. The polymerization catalyst according to claim 9, wherein said fluorine-containing compound is a complex of boron trifluoride and a compound selected from the group consisting of $C_1$-$C_5$ aliphatic ethers, alcohols, ketones and nitriles.

12. A polymerization catalyst according to claim 9, wherein said organoaluminum compound is selected from the group consisting of trimethylaluminum, triethylaluminum, tripropylaluminum, tributylaluminum, triisobutylaluminum, trihexylaluminum, trioctylaluminum and diisobutylaluminum hydride.

13. The polymerization catalyst according to claim 12, wherein said organoaluminum compound is triethylaluminum or triisobutylaluminum.

14. The polymerization catalyst according to claim 11 wherein said boron trifluoride complex is boron trifluoride dibutyl etherate.

\* \* \* \* \*